US010655600B2

(12) United States Patent
Abreu (10) Patent No.: US 10,655,600 B2
(45) Date of Patent: May 19, 2020

(54) BI-DIRECTIONAL CLUTCH FOR WIND TURBINE YAW LOCKING SYSTEM

(71) Applicant: General Electric Company, Schenectady, NY (US)

(72) Inventor: Christopher Rene Abreu, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 3 days.

(21) Appl. No.: 15/806,488

(22) Filed: Nov. 8, 2017

(65) Prior Publication Data

US 2019/0136831 A1    May 9, 2019

(51) Int. Cl.
| | | |
|---|---|---|
| *F03D 7/02* | (2006.01) |
| *F16D 67/02* | (2006.01) |
| *F16D 63/00* | (2006.01) |
| *F03D 80/70* | (2016.01) |
| *F16D 121/14* | (2012.01) |

(Continued)

(52) U.S. Cl.
CPC ......... *F03D 7/0204* (2013.01); *F03D 7/0244* (2013.01); *F03D 80/70* (2016.05); *F16D 63/006* (2013.01); *F16D 67/02* (2013.01); *F05B 2250/411* (2013.01); *F05B 2260/502* (2013.01); *F05B 2260/902* (2013.01); *F16D 2121/14* (2013.01); *F16D 2127/06* (2013.01); *F16D 2129/04* (2013.01)

(58) Field of Classification Search
CPC .... F03D 7/0204; F03D 7/0208; F03D 7/0212; F03D 7/0244; F03D 80/70; F16D 63/006; F16D 67/02; F16D 2121/14; F16D 2127/06; F16D 2129/04; F05B 2250/411; F05B 2260/502; F05B 2260/902
USPC .......................................................... 416/1
See application file for complete search history.

(56) References Cited

U.S. PATENT DOCUMENTS

| | | | |
|---|---|---|---|
| 8,174,144 B2 | 5/2012 | Nies |
| 9,194,374 B2 | 11/2015 | Valero Lafuente |
| 9,581,137 B2 | 2/2017 | Canedo Pardo |

(Continued)

FOREIGN PATENT DOCUMENTS

KR    2012 0042371 A    5/2012

OTHER PUBLICATIONS

EP Search Report, Apr. 16. 2019.

*Primary Examiner* — Richard A Edgar
*Assistant Examiner* — Joshua R Beebe
(74) *Attorney, Agent, or Firm* — Dority & Manning, P.A.

(57) ABSTRACT

A yaw system for a wind turbine can have a yaw bearing with an outer bearing ring, an inner bearing ring, and a plurality of yaw rollers rotationally disposed between the outer and inner bearing rings so as to allow relative motion between the outer and inner bearing rings. A bi-directional braking assembly having an outer clutch ring attached to the outer bearing ring, an inner clutch ring attached to the inner bearing ring, and a plurality of brake rollers rotationally and slidably disposed between the inner clutch ring and at least one locking ramp adjacent the outer clutch ring. A plurality of spring members can extend from either ring projections or activation projections to each brake roller. An activation ring can slidably position the plurality of brake rollers into one of a locked position or unlocked position to prevent yaw rotation in an undesired direction.

14 Claims, 6 Drawing Sheets

(51) Int. Cl.
*F16D 127/06* (2012.01)
*F16D 129/04* (2012.01)

(56) References Cited

U.S. PATENT DOCUMENTS

| | | | |
|---|---|---|---|
| 10,215,156 B2* | 2/2019 | Caffrey | F03D 7/022 |
| 2007/0068742 A1 | 3/2007 | Agardy et al. | |
| 2011/0057451 A1 | 3/2011 | Volmer et al. | |
| 2011/0206515 A1* | 8/2011 | Edenfeld | F03D 7/0204 |
| | | | 416/147 |
| 2011/0254281 A1 | 10/2011 | Noda et al. | |
| 2011/0299975 A1 | 12/2011 | Pechlivanoglou | |
| 2014/0041474 A1* | 2/2014 | Close | F03D 7/0204 |
| | | | 74/405 |
| 2014/0133983 A1* | 5/2014 | Canedo Pardo | F03D 7/0244 |
| | | | 416/9 |
| 2015/0118056 A1 | 4/2015 | Rose, Jr. et al. | |
| 2015/0211494 A1* | 7/2015 | Betran Palomas | F03D 80/00 |
| | | | 416/9 |
| 2017/0159643 A1* | 6/2017 | Kim | F03D 7/0244 |

* cited by examiner

BI-DIRECTIONAL CLUTCH FOR WIND TURBINE YAW LOCKING SYSTEM

FIELD OF THE INVENTION

The present subject matter relates generally to wind turbines and, more particularly, to methods and devices for preventing yaw rotation in an undesired direction using a bi-directional clutch.

BACKGROUND OF THE INVENTION

Most wind turbines include a yaw bearing assembly to rotate a nacelle assembly with respect to a tower. Yaw bearing assemblies can include bearings that enable the nacelle assembly to rotate on the tower. The yaw bearing assemblies are driven by yaw motors and yaw braking systems that are continuously activated to maintain and control a yaw direction of the nacelle assembly.

Some yaw bearing assemblies include sliding bearing assemblies with active braking modules and passive braking modules coupled about a ring gear. A passive sliding track is positioned between a frame of a nacelle assembly and a ring gear. The active brake assembly includes a friction pad that contacts a friction pad on the ring gear. While such a brake assembly facilitates maintaining a yaw direction of the nacelle assembly, the yaw motors must overcome the combined effect of aerodynamic loads and friction forces between the friction pads. Some yaw brake assemblies include multiple sliding tracks, which may make replacing and/or servicing friction pads within the brake assembly difficult. And some wind turbines include a yaw bearing assembly and a separate yaw brake system, which add to the complexity of wind turbine. As wind turbine rotor diameters get larger, yaw moments are becoming large and difficult to brake and control. This requires many yaw motors and very large braking forces from friction devices.

In the majority of conventional wind turbines, the hydraulic brake calipers are dimensioned to resist approximately 20% of the maximum aerodynamic load torque. The rest is provided by the motors' electro-brakes. A problem with this type of solution is that the brake caliper linings do not maintain a constant friction coefficient over time. The friction coefficient may be affected due to wear, temperature, brake disc conditions and undesired contamination (oil or grease). If the friction coefficient increases it may cause a premature failure to the brake calipers themselves. On the other hand, if the friction coefficient decreases it may encumber the gearbox motors and in the worst case it may wear down the annular gear. Furthermore, brake discs require frequent maintenance which increases the operational cost of the wind turbine and the yaw brake may further require electro-brakes in the gearboxes to resist the over torques. This may cause unpredictable damages in the gearboxes.

As such, it would be desirable for a yaw bearing assembly to include a braking system that does not require the yaw motor to overcome forces between two friction surfaces and that can apply bi-directional braking forces to resist wind turbine yawing loads during braking and normal operation. Further, it is desirable to have an integrated yaw bearing and bi-directional brake system.

BRIEF DESCRIPTION OF THE INVENTION

Aspects and advantages of the invention will be set forth in part in the following description, or may be obvious from the description, or may be learned through practice of the invention.

In one aspect, a yaw system is disclosed for a wind turbine having a tower and a nacelle, the yaw system adapted for rotating the nacelle about a yaw axis with respect to the tower. The yaw system can have a yaw bearing with an outer bearing ring, an inner bearing ring, and a plurality of yaw rollers rotationally disposed between the outer and inner bearing rings so as to allow relative motion between the outer and inner bearing rings. Also, a bi-directional braking assembly having an outer clutch ring attached to the outer bearing ring, an inner clutch ring attached to the inner bearing ring, a plurality of brake rollers rotationally and slidably disposed between the inner clutch ring and at least one locking ramp adjacent the outer clutch ring, a plurality of spring members, and an activation ring for slidably positioning the plurality of brake rollers into one of a locked position or unlocked position. The outer clutch ring can have a plurality of ring projections with at least one of the plurality of spring members extending from each ring projection to bias one of the plurality of brake rollers toward the locked position, thereby permitting relative motion between the inner clutch ring and the outer clutch ring in a first rotational direction while simultaneously preventing relative motion of the inner clutch ring and the outer clutch ring in an opposing second rotational direction when rotational torque is applied to the activation ring.

In another aspect, a yaw system similar to the one described above is disclosed, however the plurality of ring projections are replaced by a plurality of activation projections with at least one of the plurality of spring members extending from each activation projection to bias one of the plurality of brake rollers toward the locked position, thereby permitting relative motion between the inner clutch ring and the outer clutch ring in a first rotational direction while simultaneously preventing relative motion of the inner clutch ring and the outer clutch ring in an opposing second rotational direction when rotational torque is applied to the activation ring.

In another aspect, a method for bi-directional braking yaw rotation in an undesired rotational direction of a wind turbine can have the steps of; determining a desired rotational direction and an opposing undesired rotational direction around a wind turbine yaw axis of a yaw bearing ring, then indexing an activation ring of a bi-directional brake assembly so as to resist the undesired rotational direction, then releasing a first portion of a plurality of brake rollers in the bi-directional brake assembly into an unlocked overrunning position to freely rotate, and simultaneously wedging a second portion of the plurality of brake rollers in the bi-directional brake assembly into a locked position between at least one locking ramp and an inner or outer clutch ring to prevent undesired rotation of the yaw bearing ring.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter discloses methods and devices for wind turbine yaw braking systems using a bi-directional clutch locking mechanism which can be unlocked for overrunning in either direction during required yaw events. This clutch can prevent the yaw bearing from rotating in either direction and has sufficient braking capacity to absorb the yaw moment. The bi-directional clutch mechanism uses a round inner ring and outer ring which has locking ramp geometry which can provide infinitely adjustable lock positioning. The outer race and inner race are connected by a plurality of brake rollers which in their locking direction wedge between the inner ring and outer ring ramp geometry to resist rotation. The clutch mechanism has a feature which allows locking and unlocking in the chosen direction by moving an activation device.

Figure 1:
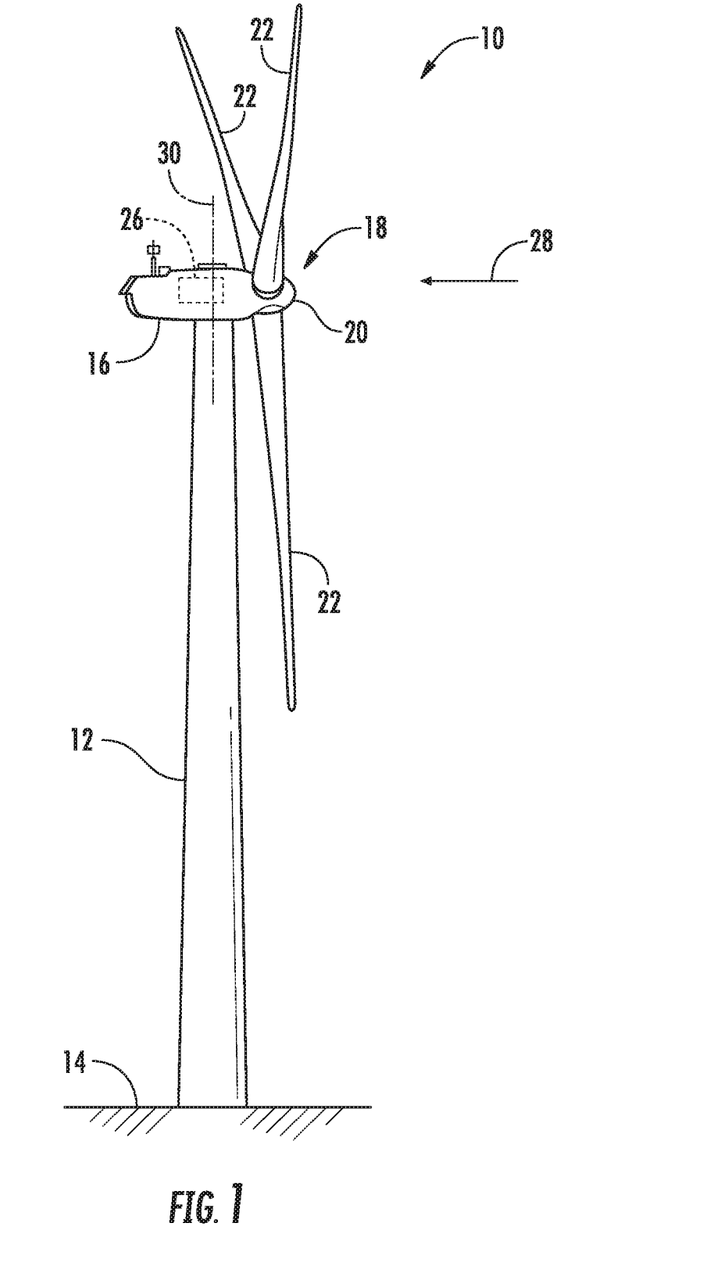
FIG. 1 illustrates a perspective view of one embodiment of a wind turbine of conventional construction.

Referring now to the drawings, FIG. 1 illustrates a perspective view of one embodiment of a wind turbine 10 of conventional construction. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or a turbine controller 26 centralized within the nacelle 16. However, it should be appreciated that the turbine controller 26 may be disposed at any location on or in the wind turbine 10, at any location on the support surface 14 or generally at any other location. In general, the turbine controller 26 may be configured to communicate with a plurality of sensors 56 to transmit and execute wind turbine control signals and/or commands in order to control the various operating modes (e.g., braking, start-up or shutdown sequences) and/or components of the wind turbine 10. For example, the controller 26 may be configured to control the blade pitch or pitch angle of each of the rotor blades 22 (i.e., an angle that determines a perspective of the rotor blades 22 with respect to the direction 28 of the wind) to control the load and power output generated by the wind turbine 10 by adjusting an angular position of at least one rotor blade 22 relative to the wind. Further, as the direction 28 of the wind changes, the turbine controller 26 may be configured to control a yaw direction of the nacelle 16 about a yaw axis 30 to position the rotor blades 22 with respect to the direction 28 of the wind, thereby controlling the load and power output generated by the wind turbine 10. For example, the turbine controller 26 may be configured to transmit control signals/commands to a yaw drive system including the yaw braking system of the wind turbine 10 such that the nacelle 16 may be rotated and braked about either direction around the yaw axis 30.

Figure 2:
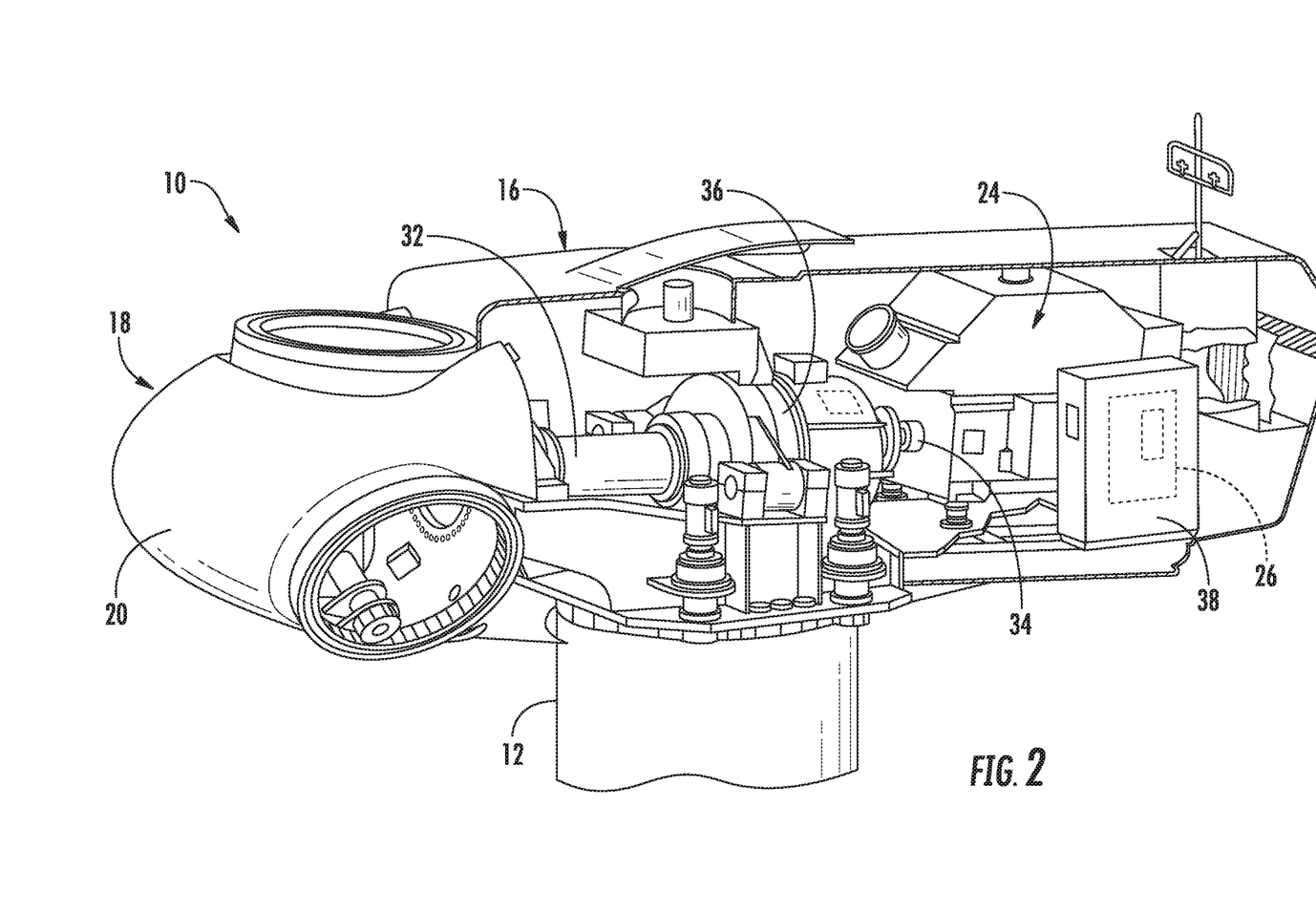
FIG. 2 illustrates a perspective, interior view of one embodiment of a nacelle of a wind turbine.

Referring now to FIG. 2, a simplified, internal view of one embodiment of a nacelle 16 of a wind turbine 10 is illustrated. As shown, a generator 24 may be disposed within the nacelle 16. In general, the generator 24 may be coupled to the rotor 18 of the wind turbine 10 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34, sometimes referred to as the high speed shaft (HSS), of the generator 24 through a gearbox 36 having a gearbox output shaft 35. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 (HSS), and thus, the generator 24.

Figure 3:
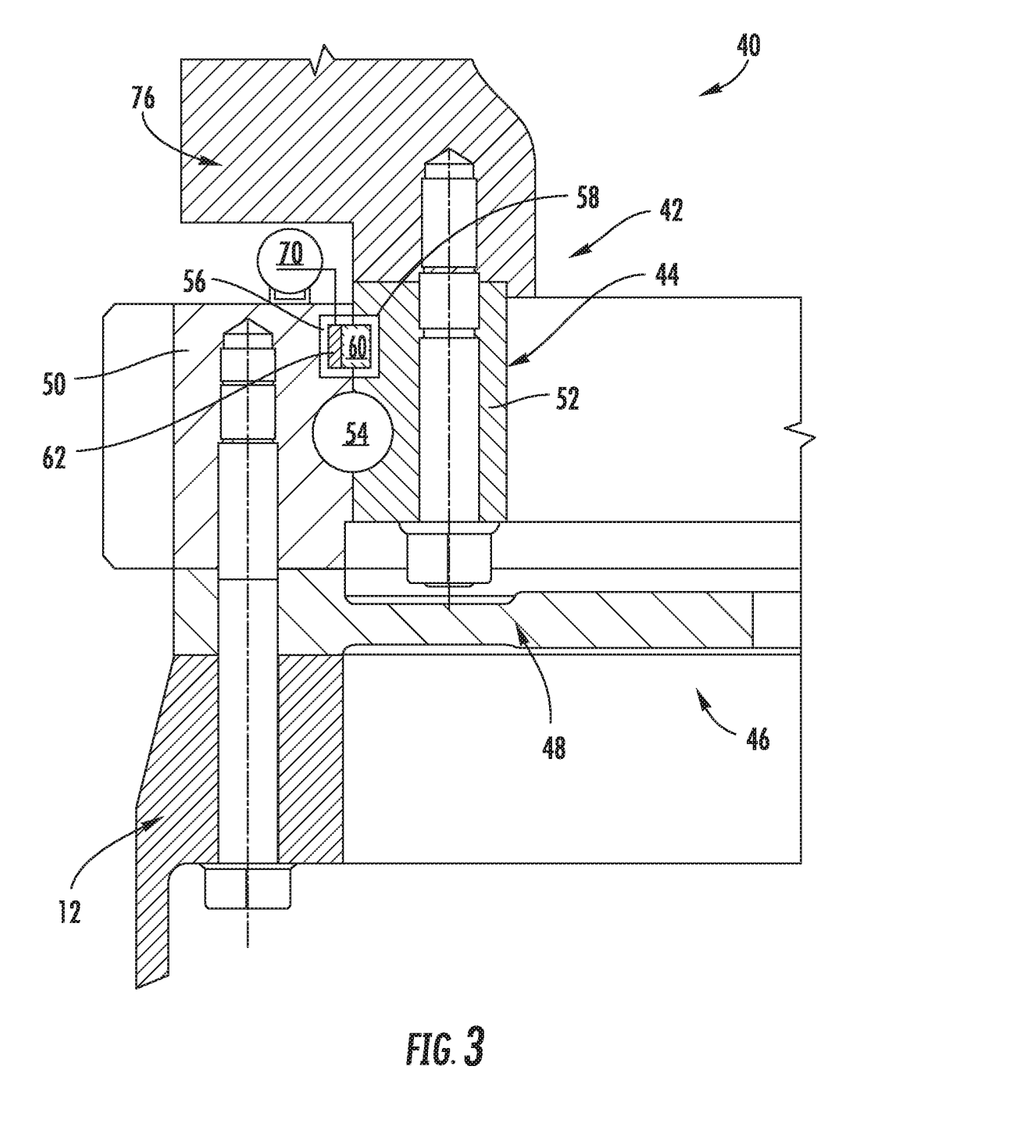
FIG. 3 illustrates a side view of a yaw system having a yaw braking system according to one embodiment, and also having a caliper-disc braking system.

FIG. 3 schematically represents a side view of an embodiment of a yaw braking system 40 having a bi-directional braking assembly 42 integrated with the yaw bearing 44 and a caliper-disc braking system 46. The caliper-disc braking system 46 can provide additional yaw braking capacity and can be used in combination with the bi-directional braking assembly 42 for controlling and maintaining desired yaw direction. The caliper-disc braking system 46 typically requires a flat circular brake disc 48 and a plurality of brake calipers (not shown) with hydraulic pistons and brake pads. The brake disc 48 may be connected to the outer bearing ring 50 of the yaw bearing 44. Brake calipers (not shown) attached to main frame 76 may engage with brake disc 48 to brake the inner bearing ring 52.

Figure 4:
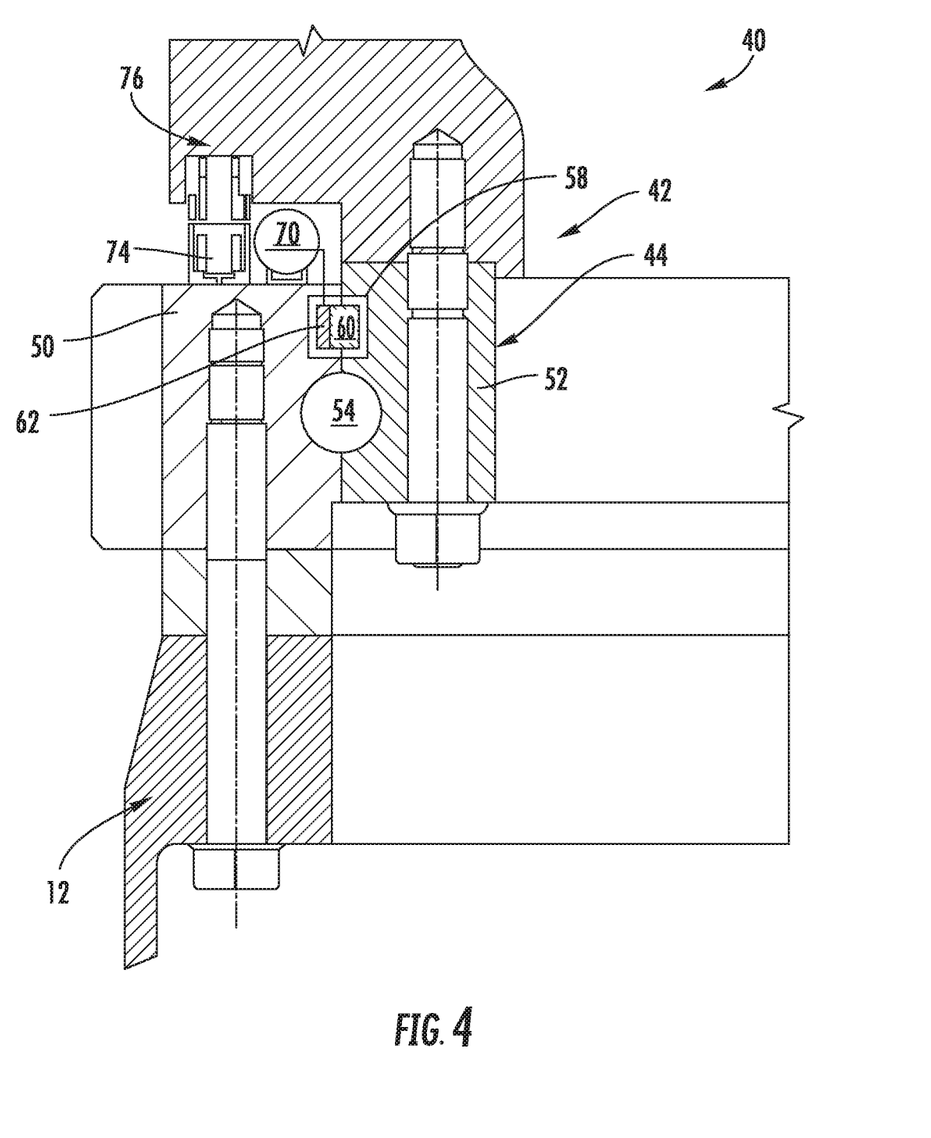
FIG. 4 illustrates a side view of a yaw system having a yaw braking system according to one embodiment, and also having a "puck" braking system.

FIG. 4 schematically represents a side view of an embodiment of a yaw braking system 40 having a bi-directional braking assembly 42 integrated with the yaw bearing 44 and a brake puck 74 yaw braking system. The brake pucks 74 can provide additional yaw braking capacity and can be used in combination with the bi-directional braking assembly 42 for controlling and maintaining desired yaw direction as well as restraining yaw rotation in the desired rotational direction.

Figure 5:
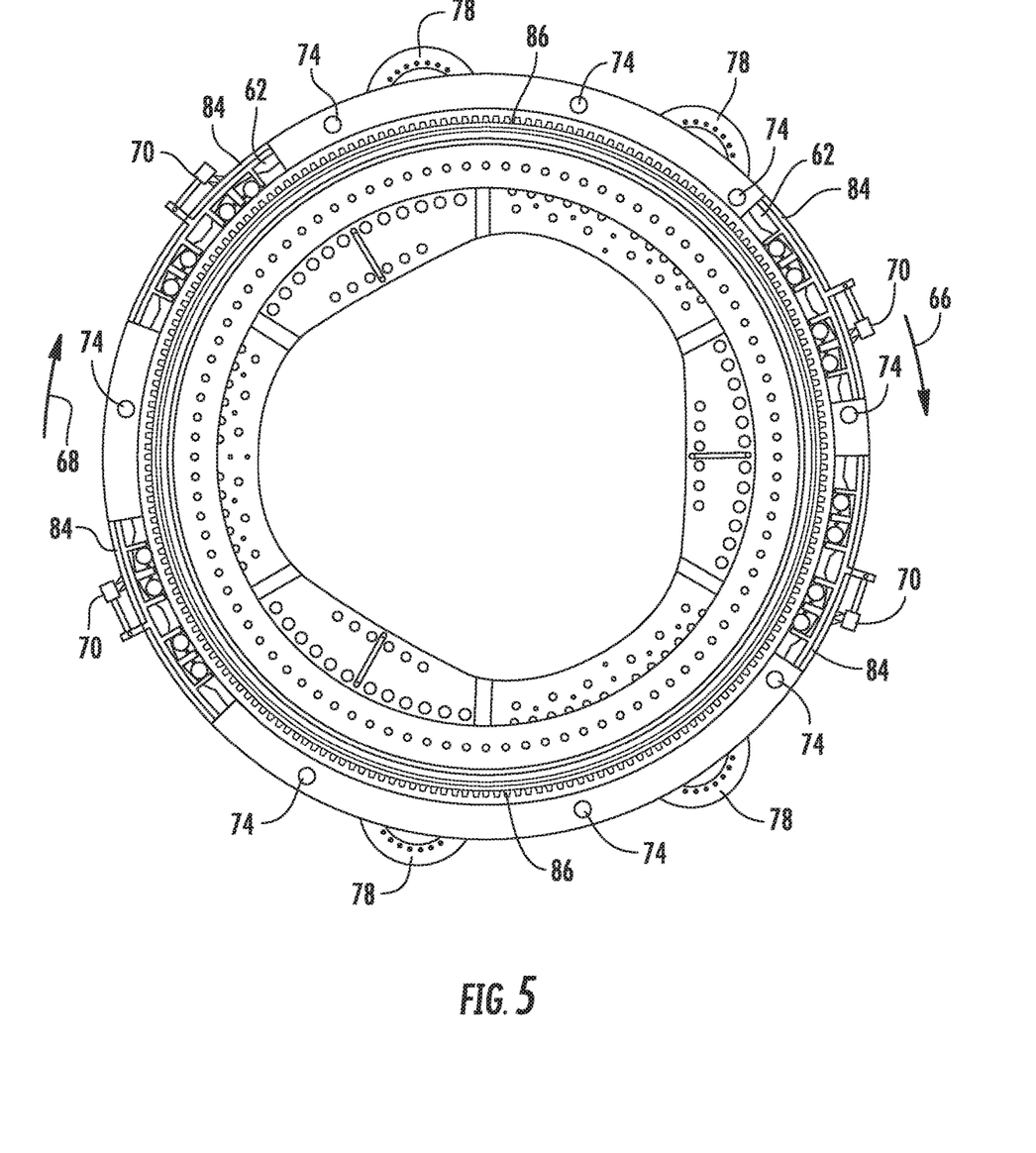
FIG. 5 illustrates a top view of an embodiment of a segmented yaw braking system.

FIG. 5 illustrates a top view of an embodiment of a segmented yaw braking system 84 which can position the bi-directional braking assembly 42 in multiple segments around the perimeter of the yaw bearing 44 thereby allowing clearance for brake pucks 74 between segments of the segmented yaw braking system 84. Further shown in FIG. 5, yaw motor mounts 78 can support yaw motors that engage with an annular gear 86 to rotate the wind turbine main frame 76 in concert with the yaw braking system 40 to maintain a desired yaw direction. In the illustrated example, the annular gear 86 is arranged on an external circumference of the tower 12. The yaw braking system 40 can be applied on a wind turbine having a tower 12 and a nacelle 16, and can be adapted for braking the undesired rotation direction of the nacelle 16 about a yaw axis 30 with respect to the tower 12.

Figure 6:
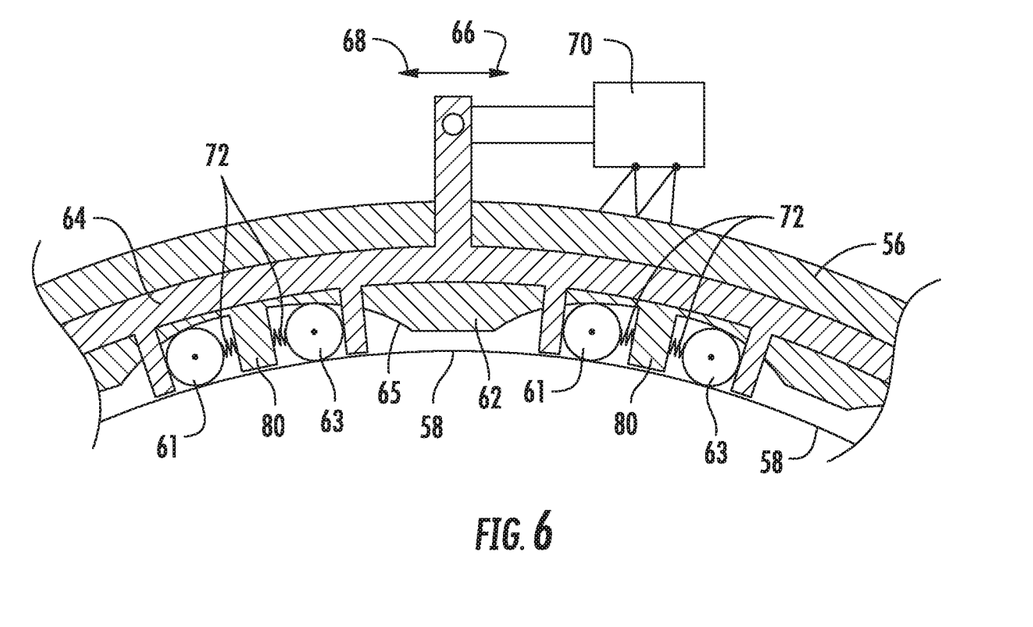
FIG. 6 illustrates an embodiment of a yaw braking system with the spring elements extending from ring projections.

As shown in FIG. 6, the yaw braking system 40 can have a yaw bearing 44 with an outer bearing ring 50, an inner bearing ring 52, and a plurality of yaw rollers 54 rotationally disposed between the outer 50 and inner bearing rings 52 so as to allow relative motion between the outer 50 and inner bearing rings 52. The plurality of yaw rollers 54 can be arranged in multiple annular rows or a single annular row. The bi-directional braking assembly 42 can have an outer clutch ring 56 attached to the outer bearing ring 50, an inner clutch ring 58 attached to the inner bearing ring 52, a plurality of brake rollers 60 rotationally and slidably disposed between the outer clutch ring 56 and at least one locking ramp 62, and an activation ring 64 for slidably positioning the plurality of brake rollers 60 into one of a locked position or unlocked position. The bi-directional braking assembly 42 permits relative motion between the inner clutch ring 58 and the outer clutch ring 86 in a first desired rotational direction 66 while simultaneously preventing relative motion of the inner clutch ring 58 or the outer clutch ring 86 in an opposing second undesired rotational direction 68 when rotational torque is applied to the activation ring 64. The yaw braking system 40 can further have a plurality of spring members 72, each of the spring members 72 biasing one of the plurality of brake rollers 60 toward the locked position.

Continuing in FIG. 6, the outer clutch ring 56 can further have a plurality of ring projections 80 with at least one of the plurality of spring members extending from each ring projection 80 to bias one of the plurality of brake rollers 60 toward the locked position. An activation device 70 can be positioned adjacent the bi-directional braking assembly 42, for example on the outer bearing ring 50, and engage with the activation ring 64 to provide rotational torque and slidably position the activation ring 64 in one of a locked first rotational direction 66/unlocked-second rotational direction 68 position or locked-second rotational direction 68/unlocked first rotational direction 66 position, or a neutral position allowing rotation in either direction. In neutral position, the activation ring 64 is centrally positioned such that all brake rollers 60 are biased in an unlocked position clearance space to freely rotate, which allows bi-directional rotation of the braking assembly 42 and the yaw bearing 44. Torque applied to the activation ring 64 by the activation device 70 easily overcomes the pressure of the spring members 72 and, for example, can slide in the first rotational direction 66 until the activation ring 64 is indexed clockwise thereby releasing a first portion of the plurality of brake rollers 61 by pushing them down the sloped locking ramp surface 65 into an unlocked position clearance space which allows rotation of the first portion 61 while simultaneously biasing a second portion of the plurality of brake rollers 63 up the sloped locking ramp surface 65 to wedge them between the locking ramp 62 and the inner clutch ring 58, thereby resisting rotation in the undesired clockwise or first rotation direction 66. Conversely, for example, the activation ring 64 can slide in the second rotational direction 68 until the activation ring 64 is indexed counter-clockwise thereby releasing the second portion of the plurality of brake rollers 63 by pushing them into an unlocked position clearance space which allows rotation of the second portion 63 while simultaneously biasing the first portion of the plurality of brake rollers 61 up the sloped locking ramp surface to wedge them between the sloped locking ramp 62 and the inner clutch ring 58, thereby resisting rotation in the undesired counter-clockwise or second rotation direction 68. The bi-directional braking assembly 42 is configured to stop undesired directional rotation of the inner clutch ring 58, the inner bearing ring 58, and the main frame 76 when torque is applied by the activation device 70.

Figure 7:
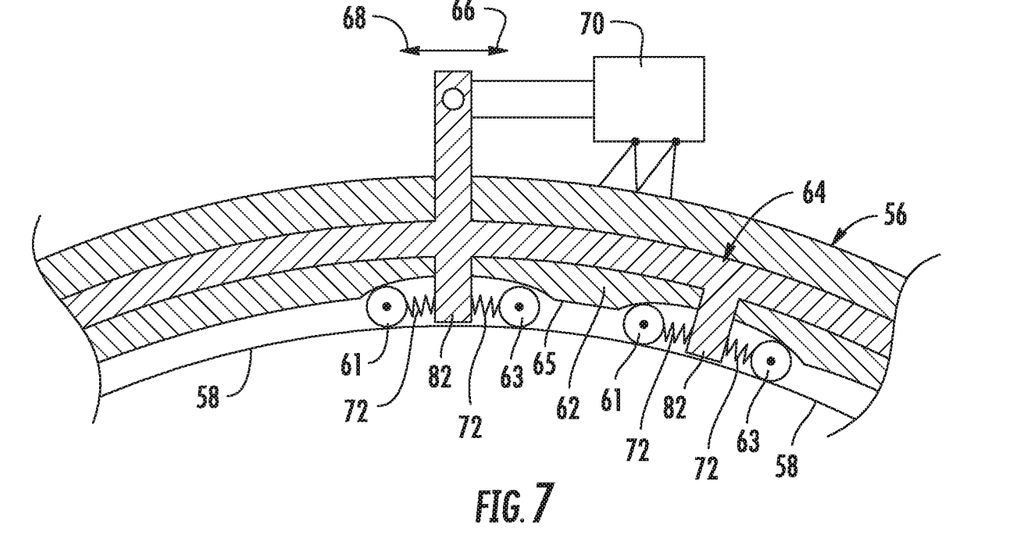
FIG. 7 illustrates an embodiment of a yaw braking system with the spring elements extending from activation projections.

FIG. 7 illustrates an embodiment of the yaw braking system 40 wherein the activation ring 64 can have a plurality of activation projections 82 with at least one of the plurality of spring members 72 extending from each activation projection 82 to bias one of the plurality of brake rollers 60 toward the locked position. This embodiment functions similar to the FIG. 6 embodiment except with the plurality of spring members 72 extending from the activation projections 82 instead of the ring projections 80.

For all embodiments, the plurality of brake rollers 60 can be at least one of roller bearings, spherical roller bearings, thrust bearings, radial bearings, ball bearings or combinations thereof. Also, the at least one locking ramp 62 can be constructed from a plurality of removable segments to facilitate maintenance and/or replacement.

Additionally, the yaw braking system 40 enables a method for braking yaw rotation in an undesired rotational direction of a wind turbine 10, which can include: determining a clockwise undesired rotational direction around a wind turbine yaw axis 30 of a yaw bearing 44 ring; indexing an activation ring 64 of a bi-directional brake assembly 42 to a clockwise position so as to resist the undesired clockwise rotational direction; releasing a first portion of a plurality of brake rollers 61 in the bi-directional brake assembly 42 into an unlocked overrunning position to freely rotate; simultaneously wedging a second portion of the plurality of brake rollers 63 in the bi-directional brake assembly 42 into a locked position between at least one sloped locking ramp 62 and an inner clutch ring 58 to prevent clockwise rotation of the yaw bearing 44 ring; determining a counter-clockwise undesired rotational direction around a wind turbine yaw axis 30 of a yaw bearing 44 ring; indexing the activation ring 64 of the bi-directional brake assembly 42 to a counter-clockwise position so as to resist the counter-clockwise undesired rotational direction; releasing the second portion of the plurality of brake rollers 63 into the unlocked overrunning position; and simultaneously wedging the first portion of the plurality of brake rollers 61 into the locked position between at least one locking ramp 62 and an inner clutch ring 58 to prevent counter-clockwise rotation of the yaw bearing 44 ring. A method can further transmit the undesired rotational direction from a wind turbine controller 26 to a yaw braking activation device 70 attached to the activation ring 64. And, a method can further bias the first 61 and second portion of plurality of brake rollers 63 into the unlocked overrunning position using a plurality of spring members 72.

It should be appreciated that the terms inner, outer, first, and second are interchangeable and merely serve to distinguish structural elements. For example, the inner rings and outer rings for the yaw bearing and bi-directional braking assembly can be assembled such that either the inner or the outer rings are stationary while the opposing ring rotates relative to the stationary ring. Also, the locking ramp can be positioned adjacent either the inner clutch ring or outer clutch ring with the activation ring positioned accordingly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A yaw system for a wind turbine, the wind turbine having a tower and a nacelle, the yaw system adapted for rotating the nacelle about a yaw axis with respect to the tower, the yaw system comprising:
    a yaw bearing comprising an outer bearing ring, an inner bearing ring, and a plurality of yaw rollers rotationally disposed between the outer and inner bearing rings so as to allow relative motion between the outer and inner bearing rings;
    a bi-directional braking assembly comprising an outer clutch ring attached to the outer bearing ring, an inner clutch ring attached to the inner bearing ring, a plurality of brake rollers rotationally and slidably disposed between the inner clutch ring and at least one locking ramp adjacent the outer clutch ring, a plurality of spring members, and an activation ring for slidably positioning the plurality of brake rollers into one of a locked position or unlocked position; and,
    wherein the outer clutch ring further comprises a plurality of ring projections with at least one of the plurality of spring members extending from each ring projection to bias one of the plurality of brake rollers toward the locked position, thereby permitting relative motion between the inner clutch ring and the outer clutch ring in a first rotational direction while simultaneously preventing relative motion of the inner clutch ring and the outer clutch ring in an opposing second rotational direction when rotational torque is applied to the activation ring.

2. The yaw system of claim 1, wherein at least one surface of the at least one locking ramp comprises a slope configured to contact the plurality of brake rollers and permit the activation ring to push a first portion of the plurality of brake rollers into the locked position while a second portion of the plurality of brake rollers remain in the unlocked position to freely rotate between the inner clutch ring and the locking ramp.

3. The yaw system of claim 1, wherein the plurality of brake rollers comprises at least one of roller bearings, spherical roller bearings, thrust bearings, radial bearings, ball bearings or combinations thereof.

4. The yaw system of claim 1, wherein the outer bearing ring and the outer clutch ring are positioned as one of an inner ring or outer ring, and the inner bearing ring and inner clutch ring are positioned as the mating inner ring or outer ring.

5. The yaw system of claim 1, wherein the bi-directional braking assembly comprises a plurality of brake segments disposed around portions of the yaw bearing.

6. The yaw system of claim 1, further comprising at least one brake puck configured for applying braking torque to the yaw bearing during rotation in the desired yaw rotation direction.

7. A yaw system for a wind turbine, the wind turbine having a tower and a nacelle, the yaw system adapted for rotating the nacelle about a yaw axis with respect to the tower, the yaw system comprising:
    a yaw bearing comprising an outer bearing ring, an inner bearing ring, and a plurality of yaw rollers rotationally disposed between the outer and inner bearing rings so as to allow relative motion between the outer and inner bearing rings;
    a bi-directional braking assembly comprising an outer clutch ring attached to the outer bearing ring, an inner clutch ring attached to the inner bearing ring, a plurality of brake rollers rotationally and slidably disposed between the inner clutch ring and at least one locking ramp adjacent the outer clutch ring, a plurality of spring members, and an activation ring for slidably positioning the plurality of brake rollers into one of a locked position or unlocked position; and,
    wherein the activation ring further comprises a plurality of activation projections with at least one of the plurality of spring members extending from each activation projection to bias one of the plurality of brake rollers toward the locked position, thereby permitting relative motion between the inner clutch ring and the outer clutch ring in a first rotational direction while simultaneously preventing relative motion of the inner clutch ring and the outer clutch ring in an opposing second rotational direction when rotational torque is applied to the activation ring.

8. The yaw system of claim 7, wherein at least one surface of the at least one locking ramp comprises a slope configured to contact the plurality of brake rollers and permit the activation ring to push a first portion of the plurality of brake rollers into the locked position while a second portion of the plurality of brake rollers remain in the unlocked position to freely rotate between the outer clutch ring and the locking ramp.

9. The yaw system of claim 7, wherein the plurality of brake rollers comprises at least one of roller bearings, spherical roller bearings, thrust bearings, radial bearings, ball bearings or combinations thereof.

10. The yaw system of claim 7, wherein the outer bearing ring and the outer clutch ring are positioned as one of an inner ring or outer ring, and the inner bearing ring and inner clutch ring are positioned as the mating inner ring or outer ring.

11. The yaw system of claim 7, wherein the bi-directional braking assembly comprises a plurality of brake segments disposed around portions of the yaw bearing.

12. The yaw system of claim 7, further comprising at least one brake puck configured for applying braking torque to the yaw bearing during rotation in the desired yaw rotation direction.

13. A method for bi-directional braking yaw rotation in an undesired rotational direction of a wind turbine, the method comprising:
- determining a desired rotational direction and an opposing undesired rotational direction around a wind turbine yaw axis of a yaw bearing ring;
- indexing an activation ring of a bi-directional brake assembly so as to resist the undesired rotational direction;
- releasing a first portion of a plurality of brake rollers in the bi-directional brake assembly into an unlocked over-running position to freely rotate; and,
- simultaneously wedging a second portion of the plurality of brake rollers in the bi-directional brake assembly into a locked position between at least one locking ramp and an inner or outer clutch ring to prevent undesired rotation of the yaw bearing ring.

14. The method of claim 13, further comprising activating at least one brake puck to restrain yaw rotation in the desired rotational direction.

* * * * *